US012789589B2

(12) United States Patent
Colwell et al.

(10) Patent No.: US 12,789,589 B2
(45) Date of Patent: Nov. 10, 2026

(54) OPERATOR CAB AND WINDOW FOR SAME

(71) Applicant: Joy Global Surface Mining Inc, Milwaukee, WI (US)

(72) Inventors: Joseph Colwell, Hubertus, WI (US); Michael Volle, Menomonee Falls, WI (US)

(73) Assignee: joy Global Surface Mining Inc., Milwaukee, WI (US)

( * ) Notice: Subject to any disclaimer, the term of this patent is extended or adjusted under 35 U.S.C. 154(b) by 439 days.

(21) Appl. No.: 18/452,321

(22) Filed: Aug. 18, 2023

(65) Prior Publication Data

US 2024/0059127 A1 Feb. 22, 2024

Related U.S. Application Data

(60) Provisional application No. 63/399,536, filed on Aug. 19, 2022.

(51) Int. Cl.
*B60H 1/26* (2006.01)
*B60H 1/00* (2006.01)
(Continued)

(52) U.S. Cl.
CPC ......... *B60H 1/265* (2013.01); *B60H 1/00357* (2013.01); *B60H 1/00378* (2013.01);
(Continued)

(58) Field of Classification Search
CPC .......... E06B 2007/026; B60H 1/00378; B60H 1/00357; B60H 1/265; B62D 33/0617
See application file for complete search history.

(56) References Cited

U.S. PATENT DOCUMENTS 2,132,421 A * 10/1938 Kannel ...................... B60J 1/14 49/63
2,389,704 A 11/1945 Lazzaro
(Continued)

FOREIGN PATENT DOCUMENTS

DE 9313053 U1 10/1993
EP 1372998 B1 10/2004
(Continued)

OTHER PUBLICATIONS

Chilean Examination and Search Report for Application No. 202302441, dated Nov. 27, 2024, 23 pages (with Statement of Relevance).

*Primary Examiner* — Daniel J Colilla
(74) *Attorney, Agent, or Firm* — Husch Blackwell LLP

(57) ABSTRACT

A cab for a mobile industrial machine includes a housing enclosing an operator environment, an airflow system configured to drive airflow to the operator environment, a first window, and a second window. The first window is positioned adjacent a first side of the housing, and the first window is positioned between the operator environment and an exterior environment. The second window includes a first pane positioned adjacent the operator environment, a second pane spaced apart from the first pane and positioned between the first pane and an exterior environment, and a passageway positioned between the first pane and the second pane. The passageway is in fluid communication with the airflow system and directs air from the airflow system toward a surface of the first window.

25 Claims, 8 Drawing Sheets

(51) Int. Cl.

| | |
|---|---|
| ***B62D 33/06*** | (2006.01) |
| ***E02F 9/16*** | (2006.01) |
| ***E06B 7/02*** | (2006.01) |

(52) U.S. Cl.

CPC ............ *B62D 33/0617* (2013.01); *E02F 9/16* (2013.01); *E06B 2007/026* (2013.01)

(56) References Cited

U.S. PATENT DOCUMENTS

| | | | | | |
|---|---|---|---|---|---|
| 2,605,516 | A | | 8/1952 | Gugliotta | |
| 3,776,358 | A | * | 12/1973 | Williams | B60H 1/00378 180/84 |
| 4,503,749 | A | | 3/1985 | Kuhn et al. | |
| 4,580,312 | A | | 4/1986 | Van Raaij | |
| 4,732,462 | A | | 3/1988 | Bel | |
| 4,874,036 | A | | 10/1989 | Masuda | |
| 5,119,718 | A | | 6/1992 | Wagner et al. | |
| 6,095,263 | A | | 8/2000 | Saunders et al. | |
| 6,171,184 | B1 | | 1/2001 | Robbins | |
| 6,520,567 | B2 | | 2/2003 | Ringger | |
| 6,938,677 | B2 | | 9/2005 | Yamakawa et al. | |
| 8,172,312 | B2 | | 5/2012 | Hobenshield et al. | |
| 8,459,727 | B2 | | 6/2013 | Mayr et al. | |
| 9,567,114 | B2 | | 2/2017 | Svartstrom | |
| 10,301,156 | B2 | | 5/2019 | Kraimer et al. | |
| 11,358,440 | B2 | | 6/2022 | Litz et al. | |
| 2019/0202272 | A1 | * | 7/2019 | Cooper | E02F 9/16 |
| 2021/0245581 | A1 | * | 8/2021 | Sheppard | B60J 1/005 |

FOREIGN PATENT DOCUMENTS

| | | | | | |
|---|---|---|---|---|---|
| EP | 1609701 | A1 | | 12/2005 | |
| GB | 922866 | A | * | 4/1963 | B60J 1/001 |
| GB | 2116692 | A | * | 9/1983 | B60H 1/245 |
| JP | 11291750 | A | | 10/1999 | |
| JP | 2009255921 | A | | 11/2009 | |
| KR | 1020160095001 | A | | 8/2016 | |

* cited by examiner

OPERATOR CAB AND WINDOW FOR SAME

CROSS-REFERENCE TO RELATED APPLICATION

This application claims the benefit of U.S. Provisional Patent Application No. 63/399,536, filed Aug. 19, 2022, the entire contents of which are incorporated by reference herein.

FIELD

The present disclosure relates to mining and construction machines. More particularly, the present disclosure relates to an operator's compartment or cab for a mobile mining machine.

BACKGROUND

Mobile industrial machines may include an operator's compartment or cab with one or more heating, ventilation, and air conditioning ("HVAC") system(s). Such operator cabs also include one or more windows or screens that provide visibility of the machine and/or worksite to an operator positioned in the cab. The HVAC system may circulate air within the cab.

SUMMARY

In one independent aspect, a cab for a mobile industrial machine includes a housing enclosing an operator environment, an airflow system configured to drive airflow to the operator environment, a first window, and a second window. The first window is positioned adjacent a first side of the housing, and the first window is positioned between the operator environment and an exterior environment. The second window includes a first pane positioned adjacent the operator environment, a second pane spaced apart from the first pane and positioned between the first pane and an exterior environment, and a passageway positioned between the first pane and the second pane. The passageway is in fluid communication with the airflow system and directs air from the airflow system toward a surface of the first window.

In another independent aspect, a cab for a mobile industrial machine includes a housing enclosing an operator environment, an airflow system configured to drive airflow to the operator environment, a seat, a first window, and a second window. The housing includes a floor, a front wall, and at least one side wall. The seat is supported on the floor of the housing. The first window is positioned adjacent the front wall of the housing, and the first window is positioned between the operator environment and an exterior environment. The second window is positioned adjacent the floor of the housing between the seat and the first window. The second window includes a first pane positioned adjacent the operator environment, a second pane spaced apart from the first pane and positioned between the first pane and an exterior environment, and a passageway positioned between the first pane and the second pane, the passageway in fluid communication with the airflow system.

In yet another independent aspect, a cab for a mobile industrial machine includes a housing enclosing an operator environment, an airflow system configured to drive airflow to the operator environment, a seat, a first window, and a second window. The housing includes a floor, a roof opposite the floor, a front wall, and at least one side wall. The airflow system is positioned adjacent the roof and including at least one duct. The seat is supported on the floor of the housing. The first window is positioned adjacent the front wall of the housing, and the first window is positioned between the operator environment and an exterior environment. The second window is positioned adjacent the floor of the housing between the seat and the first window. The second window includes a first pane positioned adjacent the operator environment, a second pane spaced apart from the first pane and positioned between the first pane and an exterior environment, and a passageway positioned between the first pane and the second pane, the passageway in fluid communication with the duct to receive air from the airflow system.

Other aspects of the disclosure will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

Figure 1:
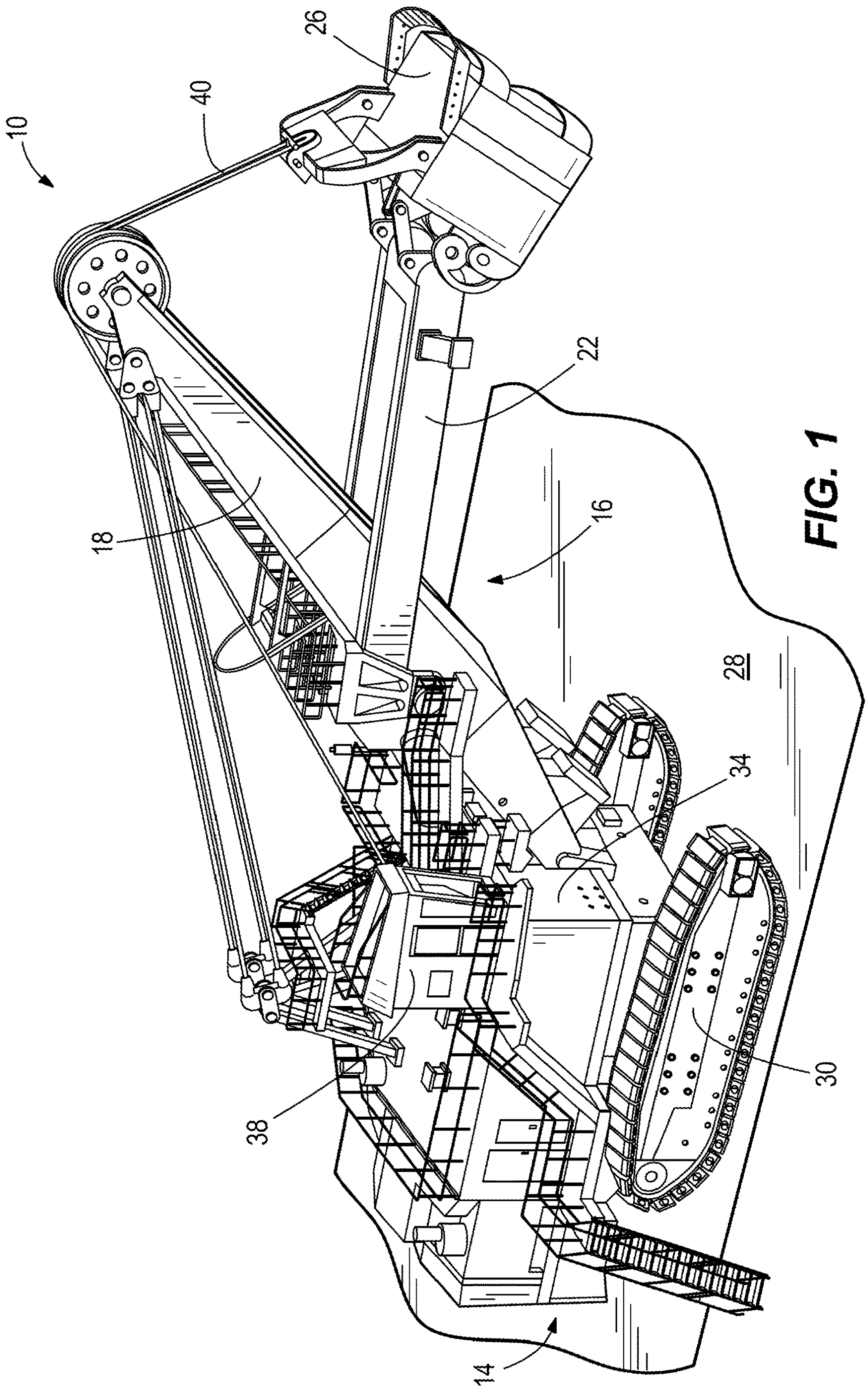
FIG. 1 is a perspective view of a mining machine.
Figure 2:
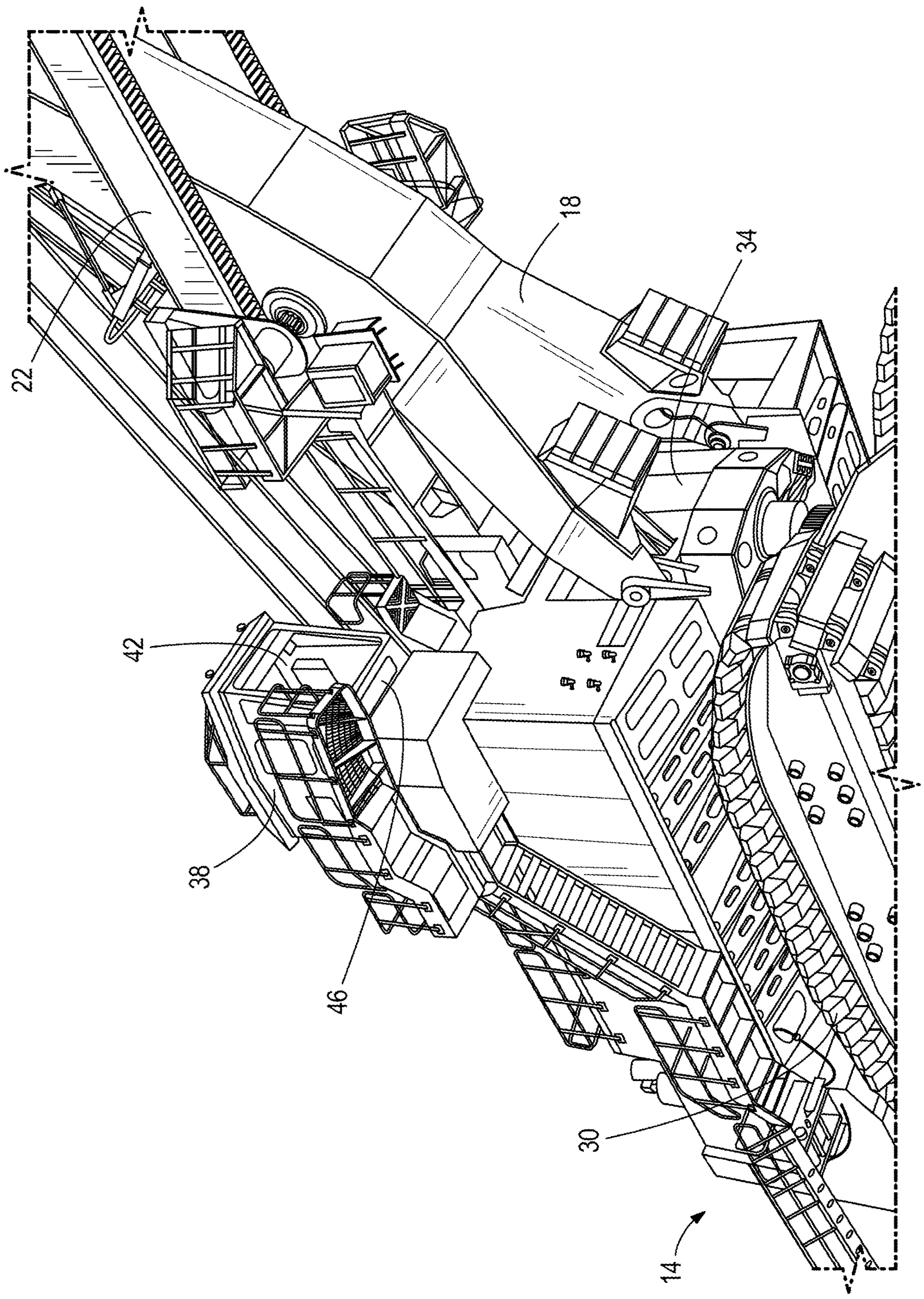
FIG. 2 is a lower perspective view of a portion of the mining machine of FIG. 1.

Although the present disclosure can be applied to or used in conjunction with a variety of mobile and fixed industrial or excavating machines (e.g., a blasthole drill, a rope shovel, a dragline, hydraulic machines, cranes (including tower cranes), etc.), embodiments of the disclosure described herein are described with respect to a rope shovel, such as the rope shovel 10 illustrated in FIGS. 1 and 2.

Referring to FIGS. 1 and 2, an industrial machine (e.g., a rope shovel 10) includes a frame or base 14 and a material mover 16 (e.g., a digging assembly) extending from the base 14. In the illustrated embodiment, the material mover 16 includes a boom 18, an elongated member or handle 22, and a digging attachment or dipper 26. Also, in the illustrated embodiment, the base 14 is a chassis supported for movement relative to a ground surface 28 by traction elements (e.g., crawlers 30), and the base 14 includes a machinery deck (e.g., deck 34). An operator's compartment or operator cab module (e.g., cab 38) is supported (in whole or in part) on the deck 34. In the illustrated embodiment, the handle 22 is supported (for example, by a shipper shaft) for translational and rotational movement relative to the boom 18. Also, in the dipper 26 is coupled to an end of the handle 22 and is supported by a hoist rope 40.

As further illustrated in FIGS. 1 and 2, the cab 38 is positioned generally above the crawlers 30 and behind the boom 18, the handle 22, and the dipper 26. The operator is positioned in the cab 38 and is able to view the worksite and the rope shovel 10, especially the material mover 16 and the crawlers 30 moving along the ground surface 28. In the illustrated embodiment, the cab 38 is located in an elevated position with respect to the rest of the machine. Referring now to FIG. 2, in the illustrated embodiment the cab 38 includes a plurality of screens, windshields, or windows, including a front window 42 generally facing forwardly toward the material mover 16, and a bottom or floor window 46 generally facing downwardly toward the ground surface 28. The front window 42 and the floor window 46 may include a surface treatment for improved slip and/or scratch resistance. For example, a coating and/or a texture may be provided (e.g., on a glass surface) to increase friction between the floor window 46 and footwear (e.g., wet and/or muddy boots and or the like). In the illustrated embodiment, the cab 38 is supported on the deck 34 by dampeners 50 (FIG. 5) but could be connected to the deck 34 or another part of the rope shovel 10 (e.g., base 14, material mover 16, crawlers 30), and/or may be supported in a different manner. In some embodiments, the cab 38 is removably connected to the deck 34 as a replaceable cab assembled separately from the rope shovel 10.

Figure 3:
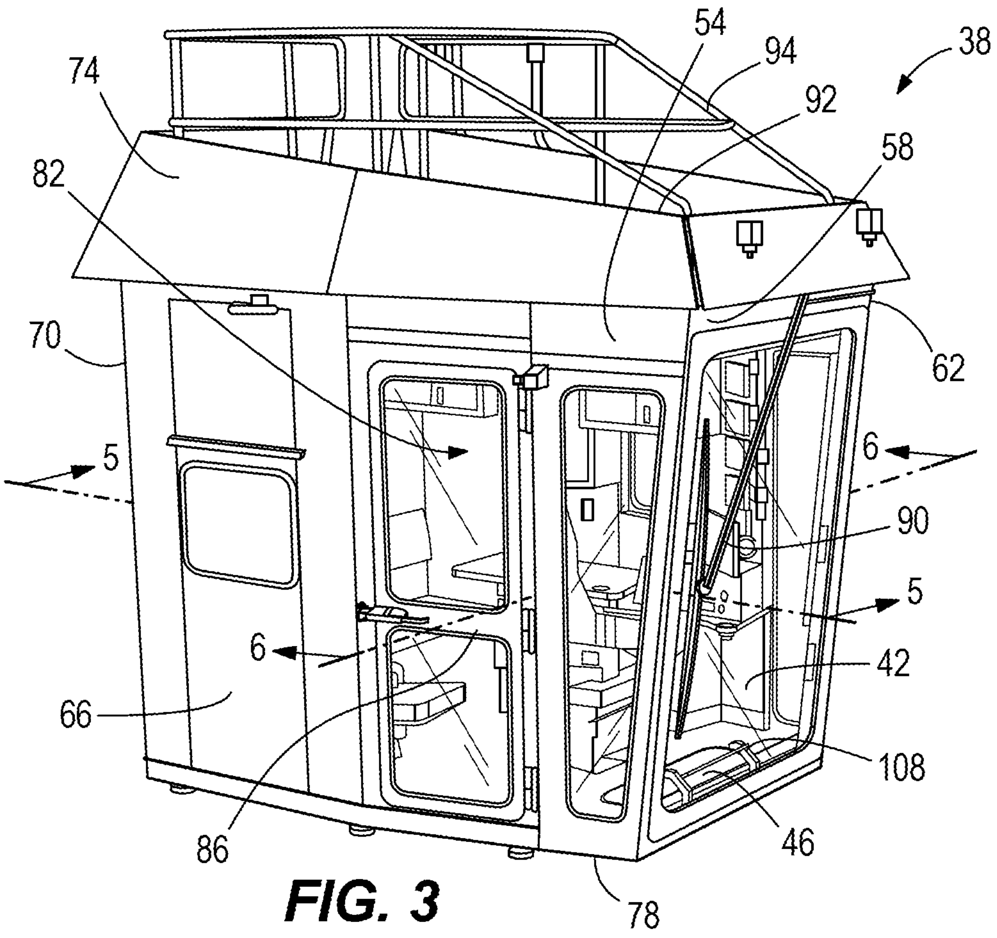
FIG. 3 is a perspective view of an operator cab.
Figure 4:
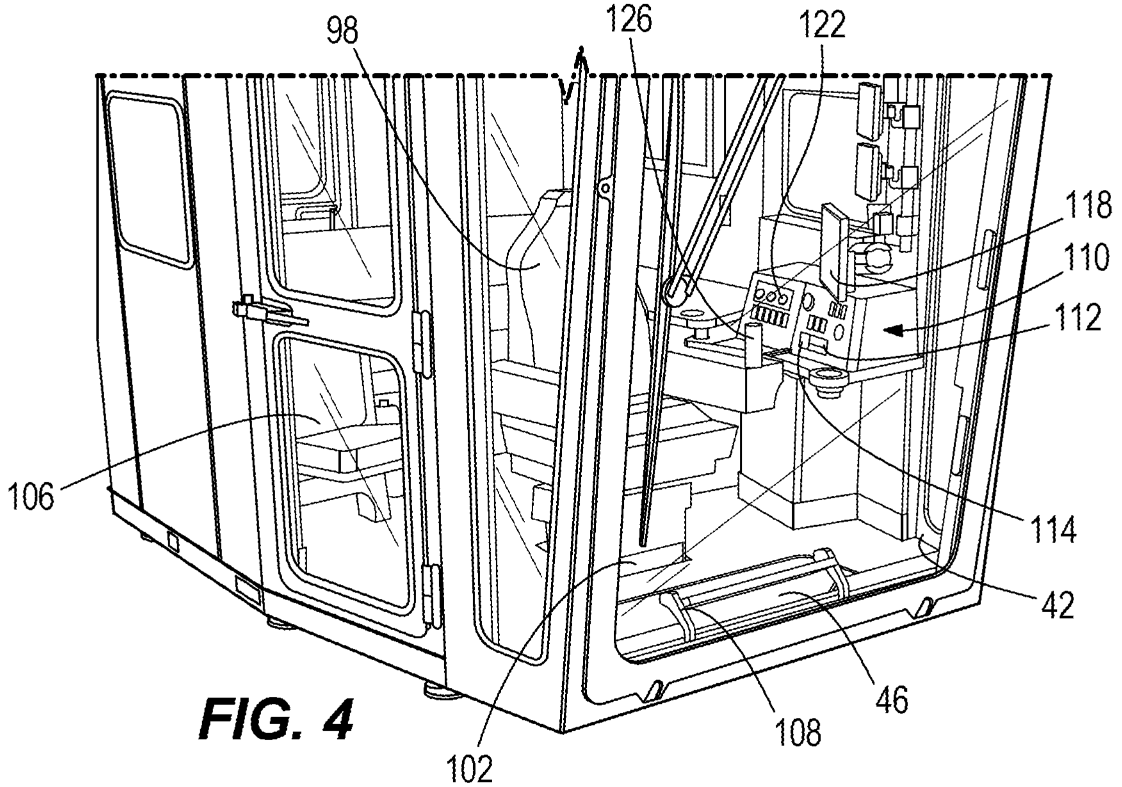
FIG. 4 is an enlarged perspective of a portion of the operator cab of FIG. 3.

As shown in FIGS. 3 and 4, in the illustrated embodiment the cab 38 includes a housing 54 and has a front portion 58 (FIG. 3), two side portions 62, 66, a back portion 70, a ceiling portion or roof 74, and a bottom portion or floor 78. The front portion 58, side portions 62, 66, back portion 70, roof 74 and floor 78 enclose an operator environment 82 that is accessible through a door 86. In the illustrated embodiment, the front window 42 is positioned adjacent the front portion 58 of the cab 38, and the floor window 46 is positioned adjacent the floor 78. The front window 42 and the floor window 46 may each be constructed from one or more safety glass panels, and may be constructed from another suitable material that is durable and allows visibility. In one embodiment, at least parts of the two side portions 62, 66, the back portion 70, the roof 74, and the floor 78 are constructed from a metallic material (e.g., steel) or another suitable material. The cab 38 further includes wipers 90 mounted on the front window 42. In other embodiments, wipers may also be mounted on the floor window 46. The roof 74 may include a technician platform 92 and support rails 94 positioned along one or more sides of the platform 92.

As shown in FIGS. 3 and 4, the cab 38 also includes a seat module (e.g., seat 98) supported in the operator environment 82. In some embodiments, the seat 98 may be supported for pivoting and/or rotational movement by a joint 102 (e.g., a swivel joint). The cab 38 may also include another seat or passenger seat 106 positioned in the operator environment 82. In the illustrated embodiment, an operator may sit in the seat 98 and face the front window 42, such that feet of the operator rest on and/or above the floor window 46. In the illustrated embodiment, a support or foot rest 108 is also mounted on the floor 78 or front portion 58 of the housing 54 and positioned between the floor window 46 and the front window 42. In some embodiments, the cab may include an actuator (e.g., a pedal) that can be actuated by an operator's foot. The seat 98 is positioned in the operator environment 82 near a control station 110 including a control panel 112, an electronic control unit ("ECU") 114 (FIG. 4), one or more graphical user interfaces (e.g., video monitors 118), and a plurality of controls 122, such as system controls, ventilation or climate controls, communication controls, leveling controls, lighting controls, steering controls, and/or the like.

The seat 98 further includes a control interface (e.g., joysticks 126) for controlling movement and operation of the rope shovel 10. In one embodiment, the joysticks 126 allow the operator to control the crawlers 30 for steering and propulsion, the material mover 16, and other functions of the rope shovel 10. The seat 98 is positioned behind the floor window 46 and the front window 42 to seat the operator above the floor window 46 and give the operator in the seat 98 visibility of the worksite, the material mover 16 in front of the cab 38, and the crawlers 30 moving along the ground surface 28 below the cab 38. In other words, the seat 98 positions the operator near the floor window 46 and the front window 42. It should be understood that the cab 38 can be manufactured separately (e.g., without the seat 98), while in some embodiments, the cab 38 and the seat 98 can be pre-assembled as a unit. For example, the cab 38 and/or the seat 98 can be installed onto a new industrial machine (e.g., rope shovel 10) at final assembly, or retrofitted to an existing industrial machine.

Figure 5:
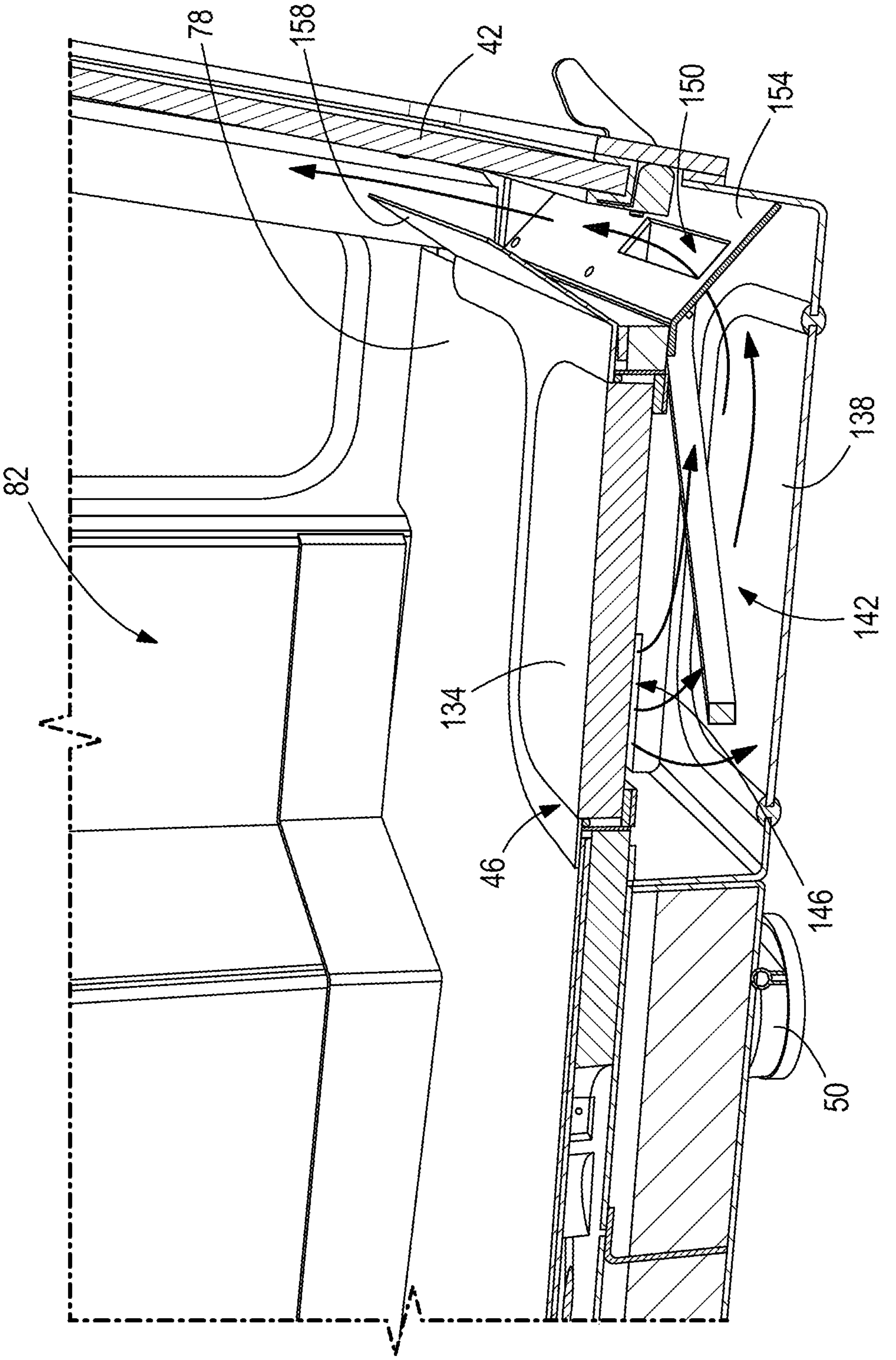
FIG. 5 is a cross-sectional perspective view of a portion of the operator cab of FIG. 3, viewed along section 5-5 in FIG. 3.
Figure 6:
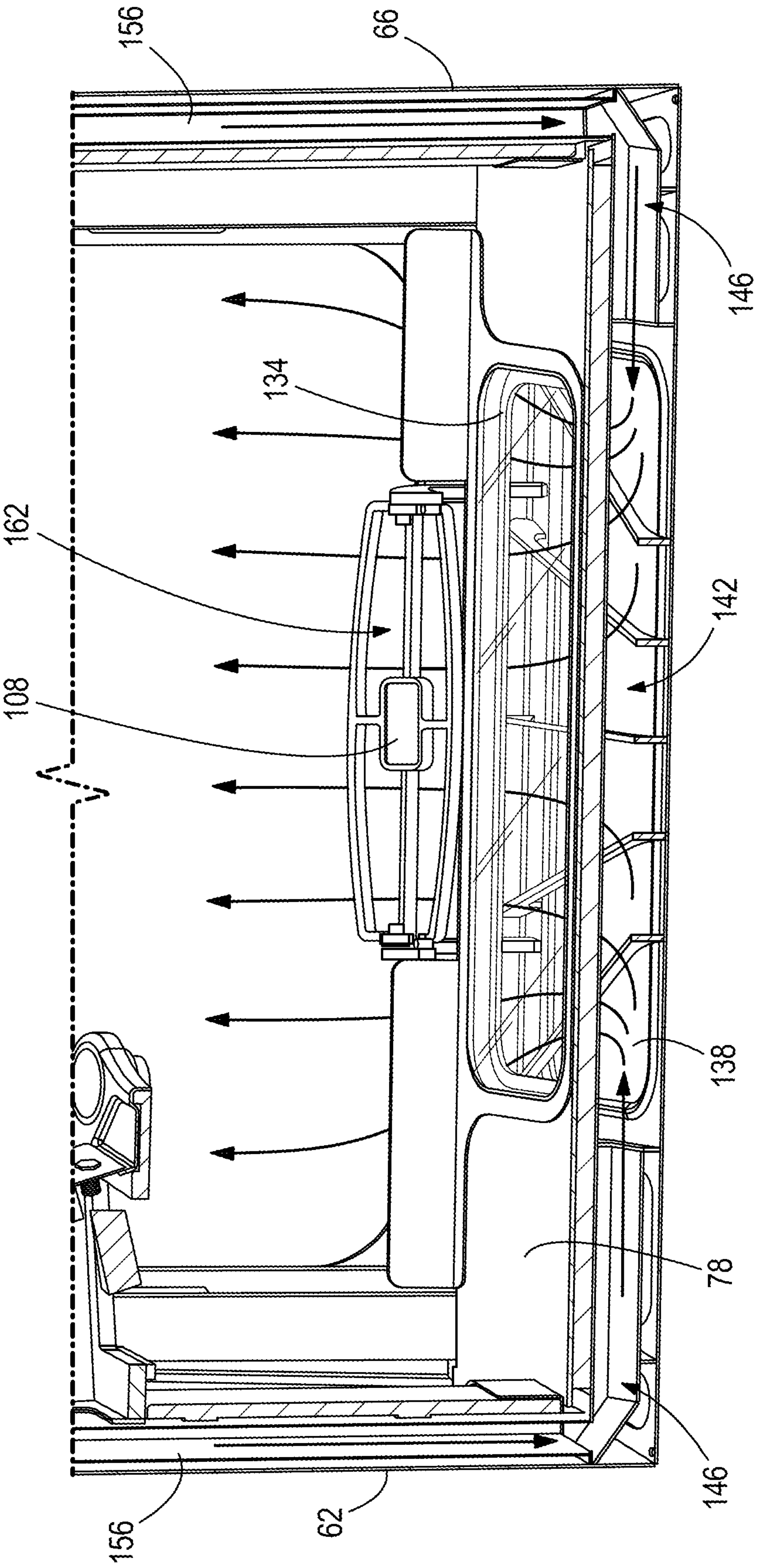
FIG. 6 is a cross-sectional perspective view of a portion of the operator cab of FIG. 3, viewed along section 6-6 in FIG. 3.
Figure 7:
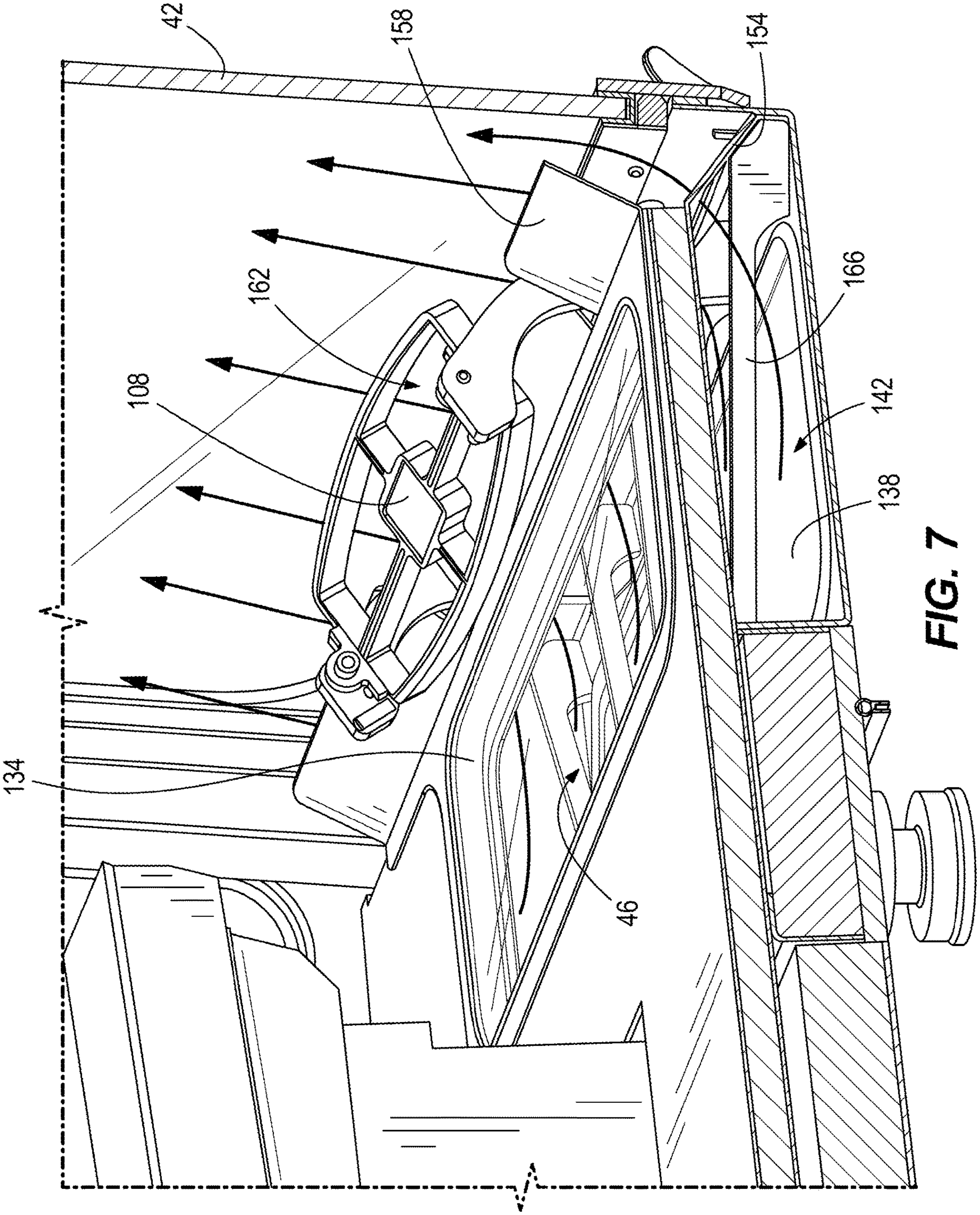
FIG. 7 is a cross-sectional perspective view of a portion of the operator cab as shown in FIG. 5.

Referring now to FIGS. 5-7, the floor window 46 includes a first panel or interior panel (e.g., floor pane 134) and a second panel or exterior panel (e.g., bottom pane 138). In the illustrated embodiment, the floor pane 134 is positioned adjacent the operator environment 82, and the bottom pane 138 is positioned adjacent an outside environment (e.g., outside of the operator environment 82, atmosphere). The bottom pane 138 may be offset from the floor pane 134, and the floor pane 134 and the bottom pane 138 may be separated by a space 142. In the illustrated embodiment, the space 142 is in fluid communication with an airflow system (e.g., a heating, ventilation, and air conditioning (HVAC) system 130—FIG. 8), and the space 142 provides a passageway configured to receive air from the airflow system. The airflow system may provide air that is heated, cooled, humidified, de-humidified, etc., as desired. As the conditioned airflow flows through the space 142, the floor pane 134 and the bottom pane 138 may be defrosted or defogged by the conditioned airflow.

In the illustrated embodiment, the floor pane 134 is recessed into the floor 78 and sealed by an adhesive, sealant, or the like. In some embodiments, the floor pane 134 is selectively removable from the floor 78 for replacement, cleaning, and/or maintenance. The space 142 includes a conditioned airflow inlet (e.g., inlet 146) in fluid communication with the HVAC system 130 and a conditioned airflow outlet (e.g., outlet 150) in fluid communication with the operator environment 82.

As illustrated in FIG. 5, the outlet 150 is formed in a first deflector or shield 154 (e.g., a baffle) extending across the space 142. The outlet 150 opens to the operator environment 82 adjacent the front window 42 and adjacent the foot rest 108, such that conditioned airflow is configured to flow from the inlet 146, through the space 142, through the outlet 150, and across the foot rest 108 and front window 42. The conditioned airflow may assist in defrosting and/or defogging the front window 42.

Referring briefly to FIG. 6, conditioned airflow is provided to the inlet 146 through one or more first ducts 156 positioned in the two side portions 62, 66 of the housing 54. The HVAC system 130 may be positioned adjacent the roof 74, and the first ducts 156 may extend downwardly from the HVAC system 130 to the inlet 146 positioned below the floor pane 134. Positioning the inlet 146 below the floor pane 134 allows conditioned airflow to travel across an under-side surface of the floor pane 134 without the need to circulate conditioned airflow across an upper-side surface (e.g., an interior surface) of the floor pane 134. Such arrangement provides conditioning of the floor pane 134 without circulating conditioned airflow specifically for the floor pane 134 throughout the operator environment 82, which could result in blowing dirt and other debris around the operator environment 82. For example, dirt, dust, and other debris may accumulate on the floor 78 and/or on an operator's foot over time, and directing conditioned airflow across the floor 78 to condition the floor pane 134 could result in agitated, dirty airflow for the operator. It should further be understood that the conditioned airflow exiting the outlet 150 also passes over the front window 42 to defrost or defog the front window 42.

Referring again to FIGS. 5-7, a second deflector or shield 158 (e.g., a baffle) extends from the floor 78 and may be positioned adjacent the foot rest 108. In some embodiments, the second deflector 158 may provide a mounting point for the foot rest 108. The second deflector 158 may direct airflow across a surface of the front window 42. The second deflector 158 may direct airflow toward a space between the foot rest 108 and the front window 42 to inhibit the conditioned airflow from flowing directly through recesses 162 in the foot rest 108. In some instances, the operator may remove their shoes and rest their feet on the foot rest 108 (e.g., to permit radiated heat from the conditioned airflow near the front window 42 to heat the operator's feet and improve comfort). Similarly, the operator may also rest their feet and/or footwear directly on the floor window 46. In other embodiments, the floor pane 134 may include an electric heater that radiates heat to the feet of the operator. Similar electric heaters could also be positioned within one or more floor mats.

As specifically illustrated in FIG. 7, support members (e.g., beams 166) are positioned within the space 142 to support the floor 78 and floor pane 134. In other embodiments, the support member(s) may include one or more grates and/or additional structural grade glass. In some embodiments, the support member(s) provide a safety feature by preventing a technician/operator from falling through the area of the floor window 46 while the floor pane 134 is removed (e.g., for replacement, cleaning, maintenance, etc.). The floor pane 134 may include a surface treatment (e.g., a coating or texture) for improved slip resistance (e.g., to inhibit a user from slipping when walking on the floor pane 134).

Referring now to FIGS. 8-11, the HVAC system 130 includes a main unit (e.g., plenum 170) mounted within the operator environment 82 adjacent the roof 74. In other embodiments, the plenum 170 is mounted outside of operator environment 82. It should be understood that, while the plenum 170 is supported in the operator environment 82, the airflow source (e.g., air conditioner, furnace, refrigerator, etc.) of the plenum 170 may be mounted on the cab 38 outside of the operator environment 82 and/or on another part of the rope shovel 10. In the illustrated embodiment, the plenum 170 includes a plurality of vents or outlets for circulating conditioned airflow through the operator environment 82. In addition to providing conditioned airflow to the space 142 through the first ducts 156, the HVAC system 130 further outputs conditioned airflow through plenum vents 174 in the plenum 170, ceiling vents 176, and wall vents 178 in the two side portions 62, 66. The conditioned airflow may be provided to the wall vents 178 via second ducts (e.g., vertical ducts 182) mounted within the operator environment 82. In other embodiments, the second ducts 182 may be mounted outside of the operator environment 82.

Figure 9:
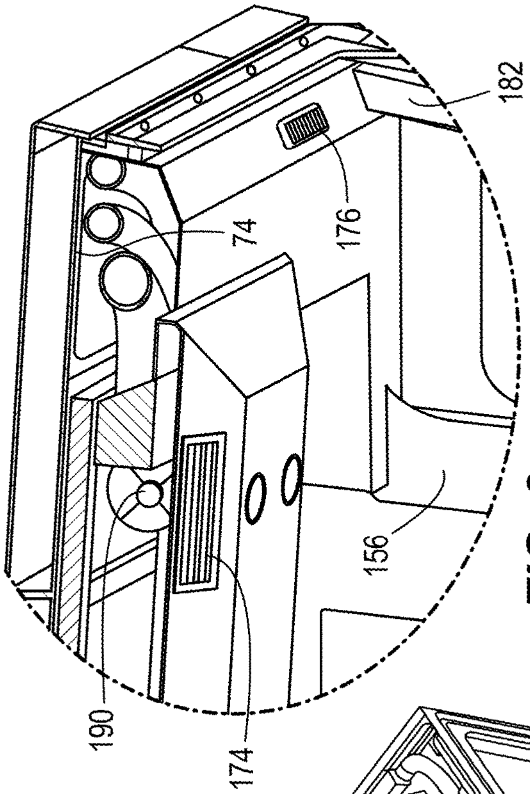
FIG. 9 is a cross-sectional perspective view of a portion of the HVAC system, viewed along section 9-9 in FIG. 8.
Figure 8:
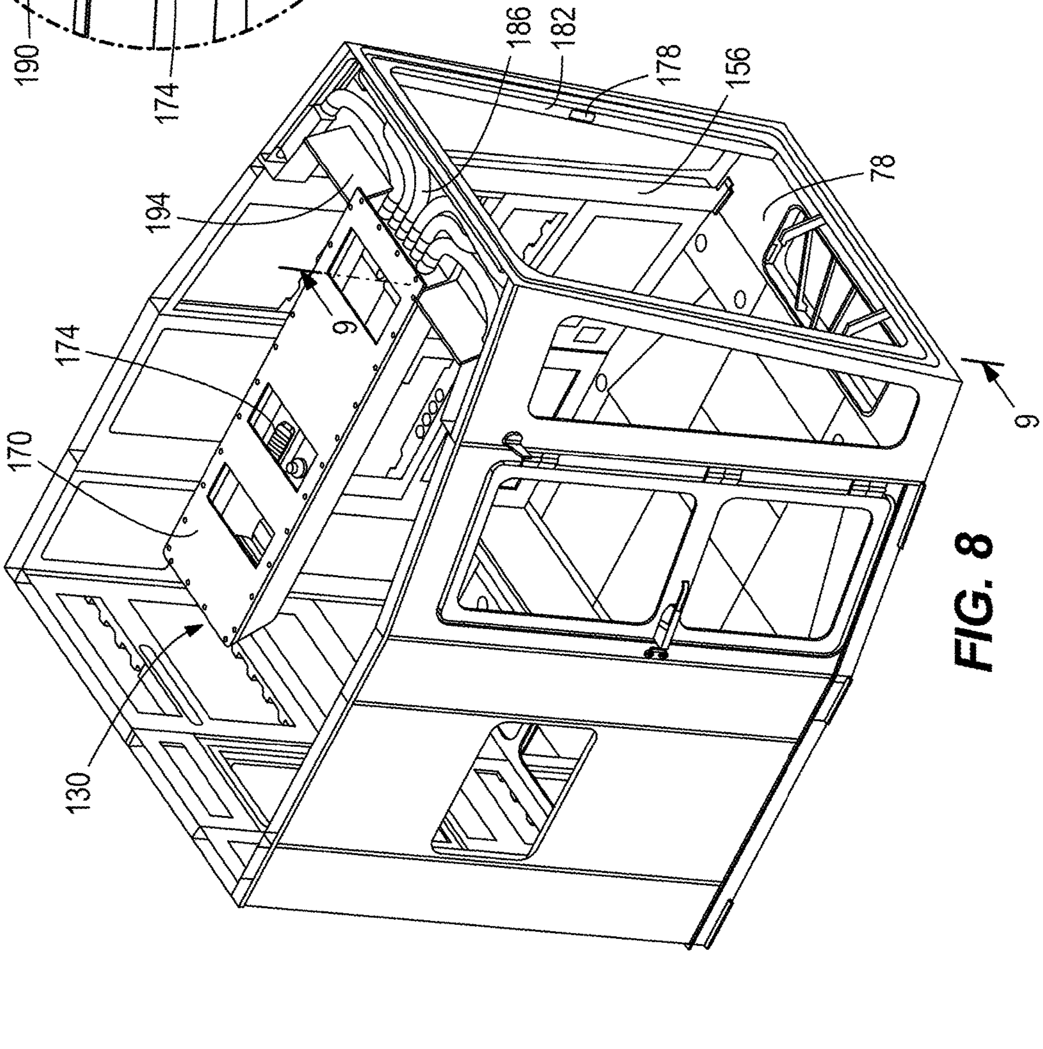
FIG. 8 is an upper perspective view of the operator cab of FIG. 3 with a ceiling part of the operator cab hidden to reveal portions of an HVAC system.
Figure 11:
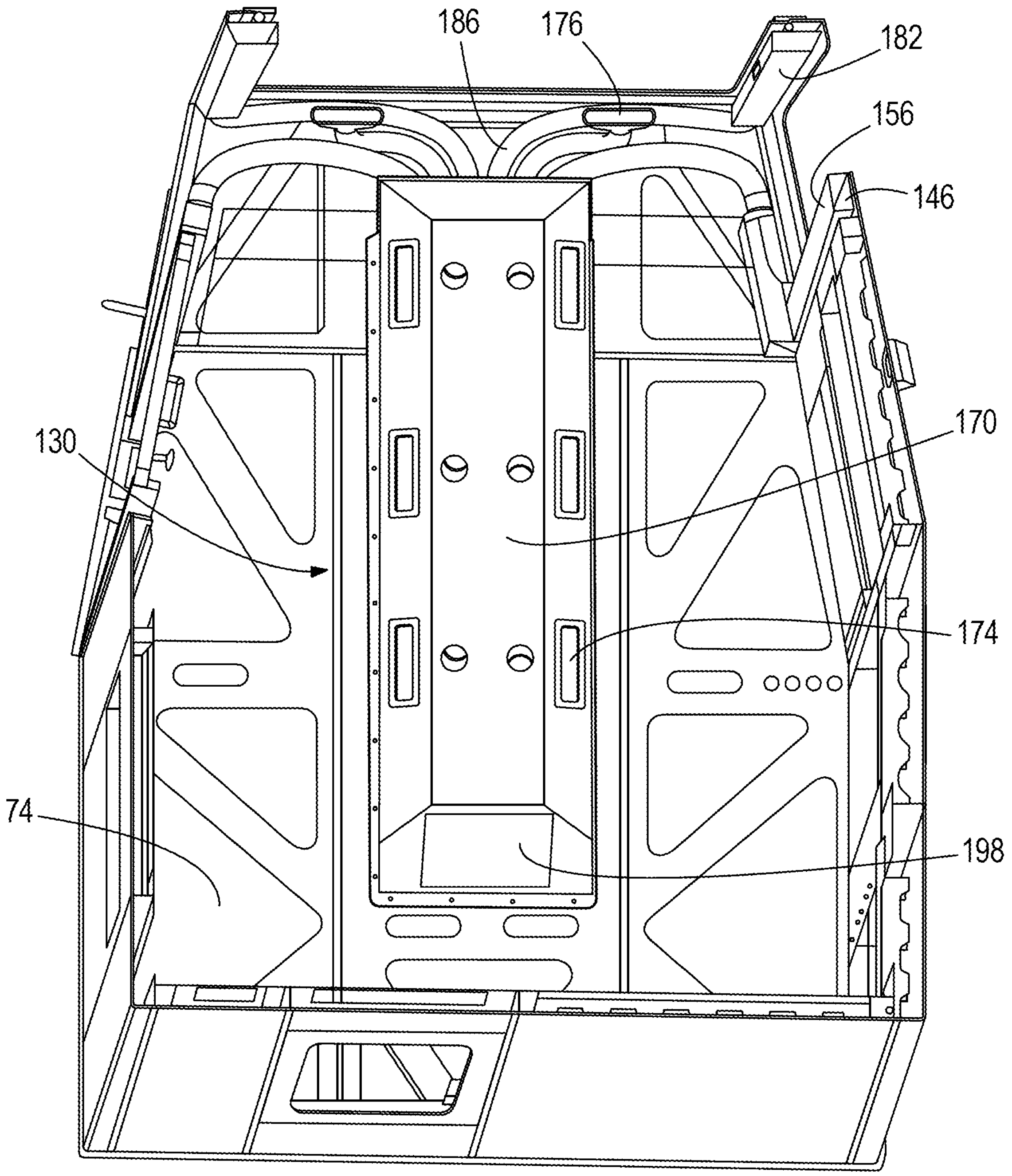
FIG. 11 is a lower perspective view of the operator cab of FIG. 3 with a floor of the operator cab hidden.

As best illustrated in FIGS. 8, 9, and 11, the conditioned airflow may be communicated from the plenum 170 to the second ducts 182 through conduit 186 routed through the housing 54. The conduit 186 also may extend from the plenum 170 to the first ducts 156 that convey conditioned airflow to the inlet 146 of the space 142 between the floor pane 134 and the bottom pane 138. In some embodiments, an airflow booster (e.g., fan 190— FIG. 9) may be provided to assist in driving the conditioned airflow to the ceiling vents 176, the wall vents 178, and more particularly, through the first ducts 156 to the inlet 146. The airflow booster may be positioned in the plenum 170. In the illustrated embodiment, the conduit 186 may be hidden by one or more covers 194 mounted to the roof 74.

Figure 10:
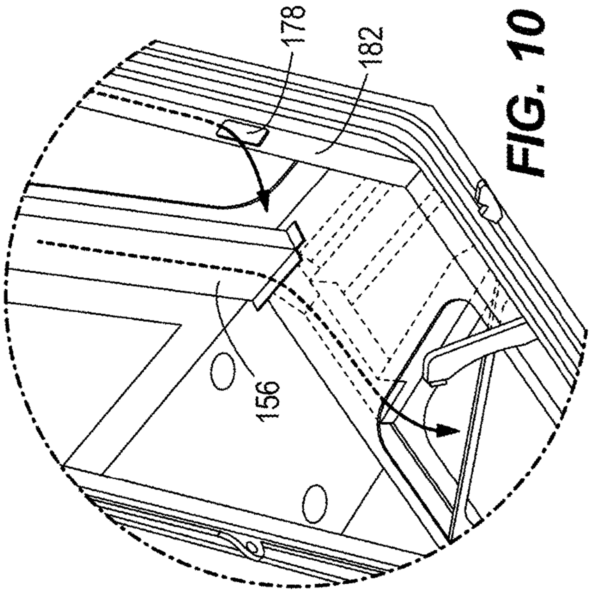
FIG. 10 is a perspective view of a portion of the operator cab of FIG. 3.

As shown in FIG. 10, in the illustrated embodiment the wall vents 178 open in a sideways direction to direct conditioned airflow laterally across the front window 42. The vents 178 may be positioned above the floor 78 by enough distance to inhibit the conditioned airflow from agitating dust and debris on the floor 78.

Referring now to FIG. 11, the HVAC system may further include a filter 198, such as a mesh filter, a HEPA filter, and/or the like. In some embodiments, the filter 198 is supported on a portion of the plenum 170. The filter 198 may be replaceable and assists in improving the air quality within the operator environment 82. During operation of the HVAC system 130, the operator may be capable of controlling desired aspects of the HVAC system 130 via the control panel 112 (FIG. 4), such as temperature, humidity, and strength of the conditioned airflow, as well as flow paths of the conditioned airflow. For example, the operator may selectively control flow of the conditioned airflow to specific vents, ducts, group of vents, etc.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A cab for a mobile industrial machine, the cab comprising:

a housing enclosing an operator environment;

an airflow system configured to drive airflow to the operator environment;

a first window positioned adjacent a first side of the housing, the first window positioned between the operator environment and an exterior environment; and a second window including:

a first pane positioned adjacent the operator environment, the first pane including a first inner surface and a first outer surface;

a second pane spaced apart from the first pane and positioned between the first pane and the exterior environment, the second pane including a second inner surface and a second outer surface, the second inner surface facing the first inner surface;

a passageway positioned between the first pane and the second pane, the passageway in fluid communication with the airflow system and directing air from the airflow system toward a surface of the first window;

an air inlet configured to direct air into the passageway and along the first inner surface and the second inner surface;

an air outlet; and a baffle positioned adjacent the air outlet and oriented at an oblique angle with respect to at least one of the first pane and the second pane, the baffle configured to direct air toward the surface of the first window.

2. The cab of claim 1, wherein the first pane is secured with respect to a floor surface, wherein the second pane is positioned below the first pane.

3. The cab of claim 1, wherein the air outlet provides fluid communication between the passageway and the operator environment, air from the airflow system directed first through the passageway before passing into the operator environment.

4. The cab of claim 1, wherein the airflow system includes an air conditioning system and is configured to drive conditioned air through the passageway.

5. The cab of claim 1, wherein the second window is positioned adjacent a lower surface of the operator environment, wherein the airflow system is positioned adjacent an upper surface of the operator environment, the airflow system including at least one duct for conveying air to the passageway of the second window.

6. The cab of claim 1, wherein the first window is positioned adjacent a front of the housing, wherein the second window is positioned adjacent a lower edge of the first window.

7. The cab of claim 1, wherein the first pane includes a surface treatment for increasing friction.

8. A cab for a mobile industrial machine, the cab comprising:

a housing enclosing an operator environment;

an airflow system configured to drive airflow to the operator environment;

a first window positioned adjacent a first side of the housing, the first window positioned between the operator environment and an exterior environment;

a second window including:

a first pane positioned adjacent the operator environment;

a second pane spaced apart from the first pane and positioned between the first pane and the exterior environment; and a passageway positioned between the first pane and the second pane, the passageway in fluid communication with the airflow system and directing air from the airflow system toward a surface of the first window; and a seat supported in the housing, wherein the second window is positioned adjacent a floor of the housing and the seat is positioned above the second window.

9. The cab of claim 8, wherein:

the first pane includes a first inner surface and a first outer surface, the second pane includes a second inner surface and a second outer surface, the second inner surface facing the first inner surface, the second window further comprises an air inlet configured to direct air into the passageway and along the first inner surface and the second inner surface, and the second window further includes an air outlet and a baffle positioned adjacent the air outlet and oriented at an oblique angle with respect to at least one of the first pane and the second pane, the baffle configured to direct air toward the surface of the first window.

10. The cab of claim 8, further comprising a support for engaging an operator's foot and an air outlet for directing airflow from the passageway through a space between the support and the first window.

11. The cab of claim 8, wherein the airflow system includes an air conditioning system and is configured to drive conditioned air through the passageway, the airflow system positioned adjacent an upper surface of the operator environment and including at least one duct for conveying air to the passageway of the second window.

12. The cab of claim 8, wherein the first pane includes a surface treatment for increasing friction.

13. A cab for a mobile industrial machine, the cab comprising:

a housing enclosing an operator environment;

an airflow system configured to drive airflow to the operator environment;

a first window positioned adjacent a first side of the housing, the first window positioned between the operator environment and an exterior environment;

a second window including:

a first pane positioned adjacent the operator environment;

a second pane spaced apart from the first pane and positioned between the first pane and the exterior environment; and a passageway positioned between the first pane and the second pane, the passageway in fluid communication with the airflow system and directing air from the airflow system toward a surface of the first window; and a support configured to support an operator's foot, wherein the second window further includes an air outlet for directing airflow from the passageway through a space between the support and the first window.

14. The cab of claim 13, wherein:

the first pane includes a first inner surface and a first outer surface, the second pane includes a second inner surface and a second outer surface, the second inner surface facing the first inner surface, the second window further comprises an air inlet configured to direct air into the passageway and along the first inner surface and the second inner surface, and the second window further includes a baffle positioned adjacent the air outlet and oriented at an oblique angle with respect to at least one of the first pane and the second pane, the baffle configured to direct air toward the surface of the first window.

15. The cab of claim 13, wherein the airflow system includes an air conditioning system and is configured to drive conditioned air through the passageway, the airflow system positioned adjacent an upper surface of the operator environment and including at least one duct for conveying air to the passageway of the second window.

16. The cab of claim 13, wherein the first pane includes a surface treatment for increasing friction.

17. A cab for a mobile industrial machine, the cab comprising:

a housing enclosing an operator environment, the housing including a floor, a front wall, and at least one side wall;

an airflow system configured to drive airflow to the operator environment;

a seat supported on the floor of the housing;

a first window positioned adjacent the front wall of the housing, the first window positioned between the operator environment and an exterior environment; and a second window positioned adjacent the floor of the housing between the seat and the first window, the second window including:

a first pane positioned adjacent the operator environment;

a second pane spaced apart from the first pane and positioned between the first pane and the exterior environment; and a passageway positioned between the first pane and the second pane, the passageway in fluid communication with the airflow system.

18. The cab of claim 17, wherein the passageway is configured to direct air through an outlet and toward a surface of the first window.

19. The cab of claim 17, wherein the first pane includes a first inner surface and a first outer surface, wherein the second pane includes a second inner surface and a second outer surface, the second inner surface facing the first inner surface, the second window further comprising an air inlet configured to direct air into the passageway and along the first inner surface and the second inner surface.

20. The cab of claim 19, further comprising a baffle positioned adjacent an outlet of the passageway and oriented at an oblique angle with respect to at least one of the first pane and the second pane, the baffle configured to direct air toward a surface of the first window.

21. The cab of claim 17, wherein the airflow system includes an air conditioning system and is configured to drive conditioned air through the passageway, the airflow system positioned adjacent an upper surface of the operator environment and including at least one duct for conveying air to the passageway of the second window.

22. The cab of claim 17, further comprising a support for engaging an operator's foot, the cab further including an air outlet for directing airflow from the passageway through a space between the support and the first window.

23. A cab for a mobile industrial machine, the cab comprising:

a housing enclosing an operator environment, the housing including a floor, a roof opposite the floor, a front wall, and at least one side wall;

an airflow system configured to drive airflow to the operator environment, the airflow system positioned adjacent the roof and including at least one duct;

a seat supported on the floor of the housing;

a first window positioned adjacent the front wall of the housing, the first window positioned between the operator environment and an exterior environment; and a second window positioned adjacent the floor of the housing between the seat and the first window, the second window including:

a first pane positioned adjacent the operator environment;

a second pane spaced apart from the first pane and positioned between the first pane and the exterior environment; and a passageway positioned between the first pane and the second pane, the passageway in fluid communication with the at least one duct to receive air from the airflow system.

24. The cab of claim 23, wherein the first pane includes a first inner surface and a first outer surface, wherein the second pane includes a second inner surface and a second outer surface, the second inner surface facing the first inner surface, the second window further comprising an air inlet configured to direct air into the passageway and along the first inner surface and the second inner surface.

25. The cab of claim 23, further comprising a support for engaging an operator's foot, the cab further including an air outlet for directing airflow from the passageway through a space between the support and the first window.

* * * * *